United States Patent
Beckius et al.

(10) Patent No.: US 7,293,006 B2
(45) Date of Patent: Nov. 6, 2007

(54) COMPUTER PROGRAM FOR STORING ELECTRONIC FILES AND ASSOCIATED ATTACHMENTS IN A SINGLE SEARCHABLE DATABASE

(75) Inventors: Bruce E. Beckius, Avon, CT (US); Robert J. Devito, Waterbury, CT (US)

(73) Assignee: Integrated Project Solutions LLC, Hartford, CT (US)

( * ) Notice: Subject to any disclaimer, the term of this patent is extended or adjusted under 35 U.S.C. 154(b) by 483 days.

(21) Appl. No.: 10/819,643

(22) Filed: Apr. 7, 2004

(65) Prior Publication Data
US 2005/0234843 A1    Oct. 20, 2005

(51) Int. Cl.
G06F 7/00     (2006.01)
G06F 17/30    (2006.01)

(52) U.S. Cl. ............... 707/1; 707/3; 707/100
(58) Field of Classification Search ........... 707/1–10, 707/100–102; 709/206
See application file for complete search history.

(56) References Cited

U.S. PATENT DOCUMENTS

| | | | |
|---|---|---|---|
| 6,820,081 B1 * | 11/2004 | Kawai et al. ............... 707/7 |
| 7,054,863 B2 * | 5/2006 | Lasensky et al. ............... 707/9 |
| 7,082,458 B1 * | 7/2006 | Guadagno et al. .......... 709/204 |
| 7,103,602 B2 * | 9/2006 | Black et al. ................. 707/101 |
| 7,113,948 B2 * | 9/2006 | Jhingan et al. ................ 707/10 |
| 2002/0112008 A1 * | 8/2002 | Christenson et al. ....... 709/206 |
| 2003/0145057 A1 * | 7/2003 | Throop ....................... 709/206 |
| 2003/0145209 A1 * | 7/2003 | Eagle et al. ................. 713/179 |
| 2005/0131928 A1 * | 6/2005 | Gauthey et al. ............ 707/101 |

OTHER PUBLICATIONS

James Koopmann, "Storing Word Documents in Oracle", Feb. 5, 2004, http://www.databasejournal.com/features/oracle/article.php/3305771, 5 pages.*

* cited by examiner

*Primary Examiner*—Hosain Alam
*Assistant Examiner*—Shew-Fen Lin

(57) ABSTRACT

A program of storing electronic files in a searchable database includes opening an electronic file having a body of text data. The file's body is stored in a body text file in a memory of a computer system. An attachment associated with the electronic file is opened. Text data of the attachment is stored in an attachment text file of the computer system. The body text file is imported into a body text file field of a first database record of a searchable database. The attachment text file is imported into an attachment text file field of a second database record of the searchable database.

11 Claims, 12 Drawing Sheets

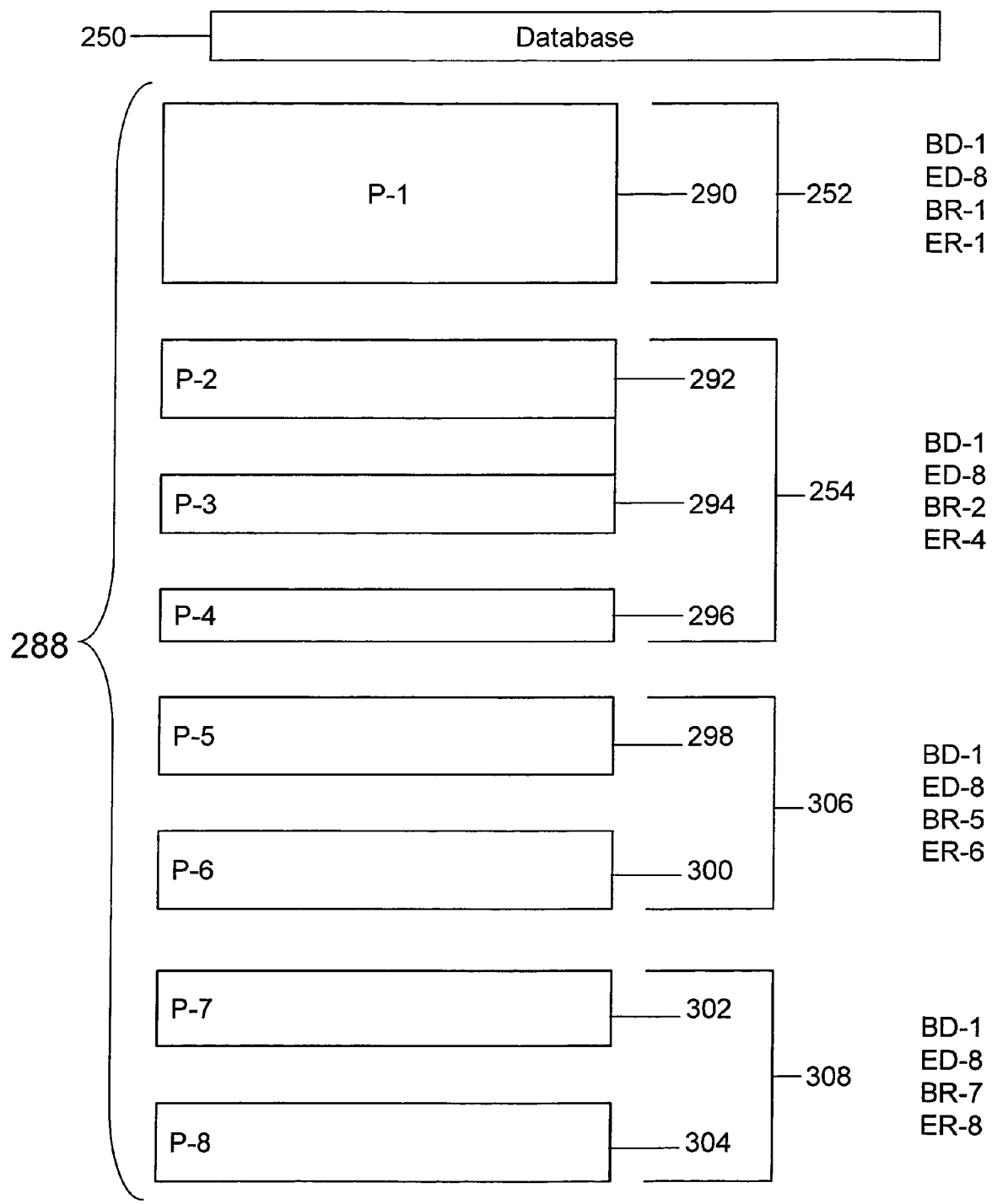

COMPUTER PROGRAM FOR STORING ELECTRONIC FILES AND ASSOCIATED ATTACHMENTS IN A SINGLE SEARCHABLE DATABASE

FIELD OF THE INVENTION

The present invention relates to a computer program for storing electronic files in a searchable database on a computer readable medium of a computer system. More specifically, the present invention relates to electronic discovery programs which store e-mails and their associated attachments in a single searchable database file.

BACKGROUND OF THE INVENTION

Searching of electronic files during the discovery phase of a litigation is becoming increasingly expensive and time consuming. Typically, litigation parties (e.g., plaintiffs and/or defendants) will serve their opponents with a request for production of documents. The request will almost always define documents to include electronic forms of communications, principally e-mails. For example, the request may inform the litigation opponent that they have 30 days to produce any and all materials including but not limited to written documents, e-mail communications and computer databases which address, describe, reference, or in any way relate to "Subject A".

The obligation of the requested party is no longer confined to a search of a filing cabinet, but rather an entire computer system. Often times too, the discovery request is served on an entire company, not just an individual. For large companies, this task can be enormous, even for reasonably drafted discovery requests. The obligation to search can extend to hundreds of servers, desk top computers, back up tapes, etc., all within a relatively short time frame.

This problem is exacerbated when the e-mails contain attachments, as they often do. Frequently, an e-mail can have very little relevant content but their associated attachments may contain voluminous amounts of data.

Electronic discovery software programs have been designed to parse electronic files, such as e-mails, into various data fields and transpose this data in to associated fields of a record in a searchable database. In that way, key word or other electronic searches can be performed on the electronic files to retrieve relevant data. However, prior art electronic discovery programs do not provide a convenient way to link e-mail files with their associated attachment files within the searchable databases. This means that an electronic search of each attachment file must be done separately from an electronic search of its associated e-mail file.

Accordingly, even with prior art electronic search programs, the burden of searching all e-mails and their attachments can be cumbersome and expensive. This is especially the case, when most of the relevant information is spread over several associated attachments to an e-mail.

SUMMARY OF THE INVENTION

The present invention offers advantages and alternatives over the prior art by providing a program for storing electronic file, such as e-mails, and associated attachments in a single searchable database. Once the database is constructed, search operations can be performed on the electronic files and their associated attachments in a single search operation.

These and other advantages are accomplished in an exemplary embodiment of the invention by providing a computer program for storing electronic files in a searchable database stored on a computer readable medium of a computer system having a memory for executing the program. The program includes opening an electronic file having a body of text data. The file's body is stored in a body text file in a memory of a computer system. An attachment associated with the electronic file is opened. Text data of the attachment is stored in an attachment text file of the computer system. The body text file is imported into a body text file field of a first database record of a searchable database. The attachment text file is imported into an attachment text file field of a second database record of the searchable database.

In an alternative embodiment of the invention a computer program is provided for storing e-mail files and associated attachments in a searchable database. The program includes opening an e-mail file having metadata and a body of text data. Selected e-mail metadata is stored in a memory of a computer system. The e-mail's body is stored in a body text file in the memory of the computer system. A body pathname indicative of the location of the body text file is stored in the memory of the computer system. An attachment associated with the e-mail is opened. Selected attachment metadata is stored in the memory of the computer system. Text data of the attachment is stored in an attachment text file in the memory of the computer system. An attachment pathname indicative of the location of the attachment text file is stored in the memory of the computer system. The selected e-mail metadata, and the body pathname are written to a predetermined set of fields of a first record of a comma delimited file. The selected attachment metadata and the attachment pathname are written to a predetermined set of fields of a second logically sequential record of the comma delimited file. The comma delimited file can then conveniently interface with other electronic discovery programs to store the e-mails and their associated attachments in a single searchable database file.

BRIEF DESCRIPTION OF THE DRAWINGS

FIG. 9 is an exemplary embodiment of the database of FIG. 7, numbered in accordance with the present invention utilizing the program of FIG. 8.

DETAILED DESCRIPTION OF THE PREFERRED EMBODIMENTS

Figure 1:
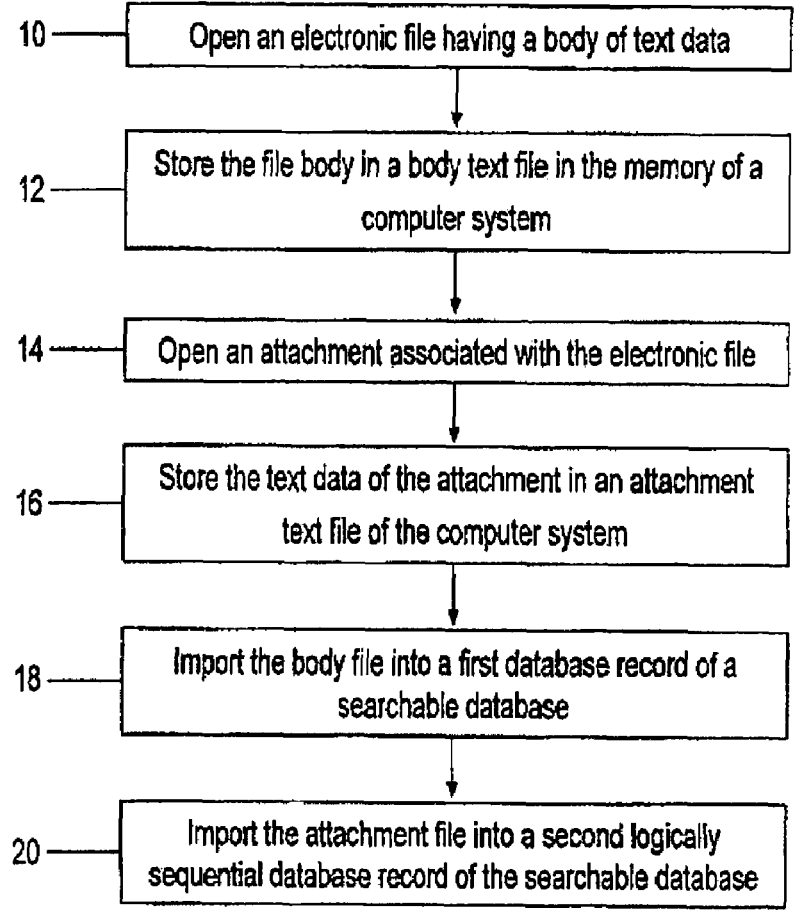
FIG. 1 is an exemplary embodiment of a basic flow diagram of a computer program for storing electronic files and associated attachments in a single searchable database in accordance with the present invention.

Referring to FIG. 1, an exemplary embodiment of a basic flow diagram of a computer program for storing electronic files and associated attachments in a single searchable database is shown generally at 8. The program is stored on a computer readable medium and executed via computer system. A significant advantage of this particular program is that any number of attachments associated with the electronic file (or files) will be stored in sequential records of the data base, thus enabling the database to perform search functions on both files and attachments in a single search operation.

A typical computer system will include a memory to store the computer program and electronic files in, mass storage devices, input and output devices, and at least one central processing unit. The computer system can range in complexity from a small desk top unit to a multi-server wide area network with many interconnected devices spread over a large geographic area.

A computer program in accordance with the present invention and exemplified in flow diagram 8 may be stored on a single computer readable medium and executed on a single central processing unit (CPU). However, one skilled in the art will recognize that the program may also be stored on several computer readable media and/or executed by several remotely located CPU. Further the program may include several, modules or separate programs which work together to create a single searchable database file in accordance with the present invention. By way of example, a litigation support program in accordance with the present invention may include a first commercialized program, e.g., Concordance® from Dataflight Software, Inc or CaseMap® from Casesoft, which interfaces with a novel second program. The combination of the first commercialized program and novel second program can be interfaced to enable the efficient storage of e-mails and their associated attachments in a single searchable database file.

In step 10 of the program an electronic file having a body of text data is first opened. The electronic file would typically be an e-mail, but may also be any organized collection of data records, possibly of different types, stored on some storage device such as magnetic tape or disk. The term text data typically refers to text stored as ASCII codes and can represent words, sentences, paragraphs and numerals. There are many different types of electronic files which can store text data including, but not limited to: data files, program files, directory files and text files. Additionally, paper documents which are scanned into a computer system are typically stored as an electronic file such as a word file.

To "open" a file as described in step 10 is to make the electronic file accessible to the computer system. Typically an operating system stored in the computer system opens the file. Opening the file can be simple or complex. For example, in a multiprocessing operating system in which different users can share the same resources, the operating system must decide whether the file can be accessed simultaneously or by more than one user.

One skilled in the art will also recognize that there are other means of opening a file other than though an operating system. For example in a client-server system, an e-mail file may be opened by a program that interfaces with the e-mails, which is associated with a client program.

Moving to step 12 of the program, once the file is opened, the text data of the electronic file is parsed out of the file and stored in a "body text file" in the memory of the computer system. The computer system's memory can be of several types, including but not limited to: disk, tape, random-access memory (RAM), read-only memory (ROM), programmable read-only memory (PROM), erasable programmable read-only memory (EPROM), electrically erasable programmable read-only memory (EEPROM), dynamic random-access memory (DRAM), and static random-access memory (SRAM).

Proceeding to step 14, an associated attachment to the electronic file is now opened. At step 16, in similar fashion to step 12, any text data in the attachment is stored in a separate "attachment file" within the memory of the computer system.

In step 18, the previously stored body text file, which contains the text data from the electronic file, is than imported into a first database record of a searchable database. Additionally, in step 20, the attachment text file, which contains the text data from the associated attachment file, is also imported into a second logically sequential database record of the same database.

Databases of this type are typically utilized by litigation support software programs. Some litigation support software programs designed for this purpose are Concordances from Dataflight Software, Inc and CaseMap® from Casesoft. A database may be any collection of information organized in such a way that a computer program can quickly select desired pieces of data. One can think of a database as an electronic filing system.

Traditional databases are organized by fields, records and files. A field is a single piece of information; a record is one complete set of fields; and a file is a collection of records. The file, i.e. the entire collection of records, can also be considered a single database. By way of example, an electronic phone book can be considered a database. The phone book contains a list of records, each of which consists of at least three fields: name, address and telephone number.

Figure 2:
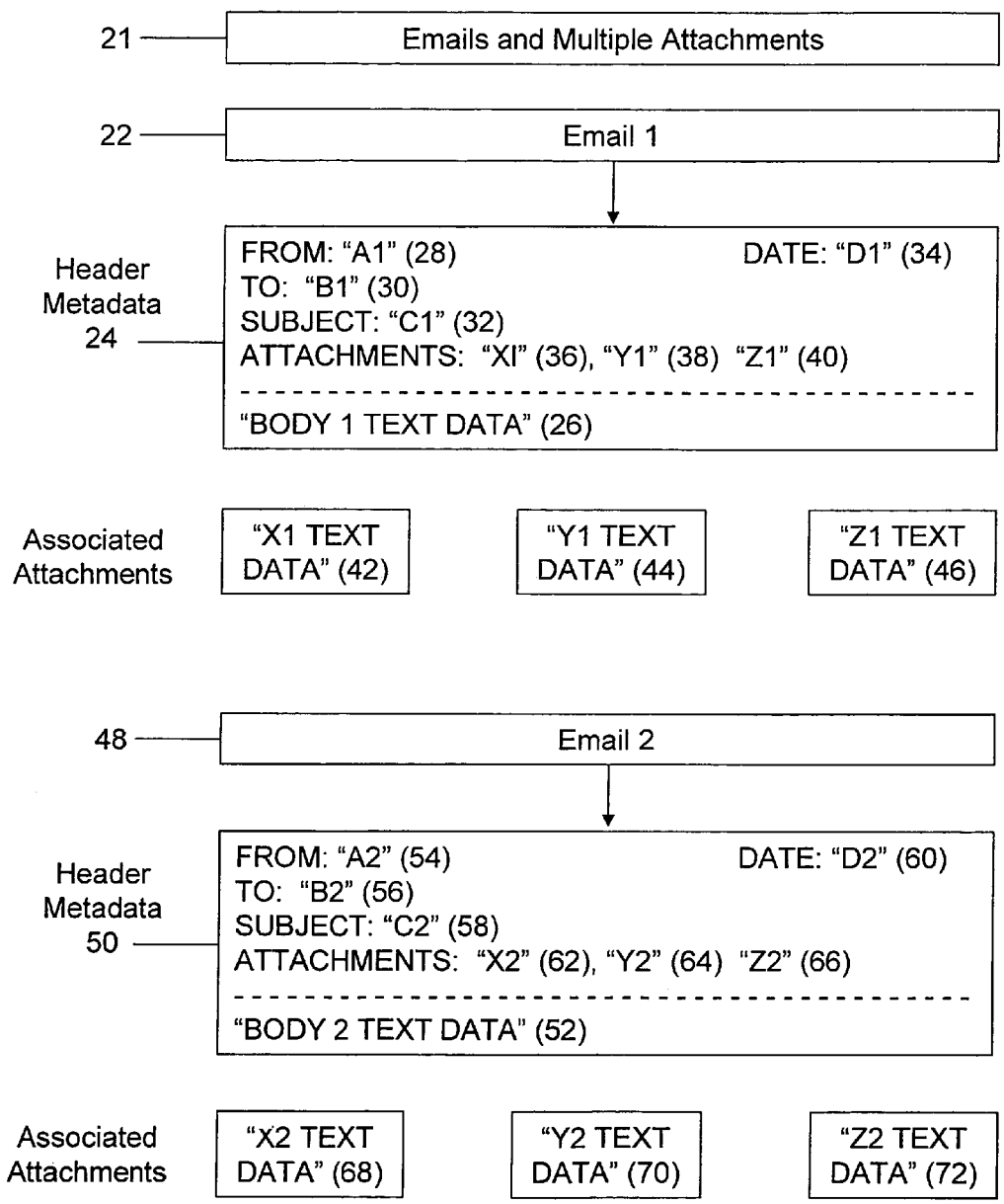
FIG. 2 is a schematic block diagram of exemplary embodiments of e-mails and associated attachments to be processed in accordance with present invention.

Referring to FIG. 2, a schematic block diagram of exemplary embodiments of emails with associated multiple attachments are shown generally at 21. Emails 22 and 48 along with their attachments 42, 44, 46, 68, 70 and 72 are typical of electronic files that would be processed into a searchable database by the program described in FIG. 1. Although only two emails are exemplified in FIG. 2, one will appreciate that there may be a need to process many thousands of electronic files with any number of associated attachments into a searchable database. A typical occasion in which this need to process large volumes of documents may arise is during the discovery phase of a complex litigation.

Emails 22 and 48 are electronic files which carry messages in electronic form from one computer user to another, usually over network. The emails 22, 48 are organized generally into two parts, a header 24, 50 and a body 26, 52.

The headers 24, 50 contain metadata. Metadata is literally data which describes other data. The metadata will typically describe how, when and by whom a particular set of data was collected, and how the data is formatted. In the instant case, both headers 24 and 50 include metadata fields for containing text data which show:

1) where the message was sent from, FROM fields 28, 54;

2) who the message was sent to, TO fields: 30, 56
3) the subject matter of the message, SUBJECT fields: 32, 58;
4) when the message was sent, DATE fields: 34, 60; and
5) the names of any associated attachments, ATTACHMENTS fields: 36, 38, 40, 62, 64, and 66.

The metadata fields each contain specific alphanumeric text data (as indicated between "quotation marks"). For example, the header 24 of email 22 shows the metadata FROM field 28 containing the alphanumeric metadata "A1", meaning that the message was sent from someone or some entity designated "A1". Additionally header 24 contains the names of the three associated attachments, i.e., "X1", "Y1" and "Z1", in metadata fields 36, 38 and 40 respectively. Also the header 50 of email 48 contains the names of its three associated attachments, i.e., "X2", "Y2" and "Z2", in metadata fields 62, 64 and 66 respectively.

The bodies (or body fields) 26 and 52 contain the main message carried by the emails 22 and 48. The messages are composed of text data represented in the instant case by the terms: "Body 1 Text Data", and "Body 2 Text Data".

The attachments (or attachment files) 42, 44, 46, 68, 70 and 72 are composed primarily of text data. The text data in each attachment is represented by the terms "X1 Text Data", "Y1 Text Data", "Z1 Text Data", "X2 Text Data", "Y2 Text Data" and "Z2 Text Data" respectively.

Figure 3:
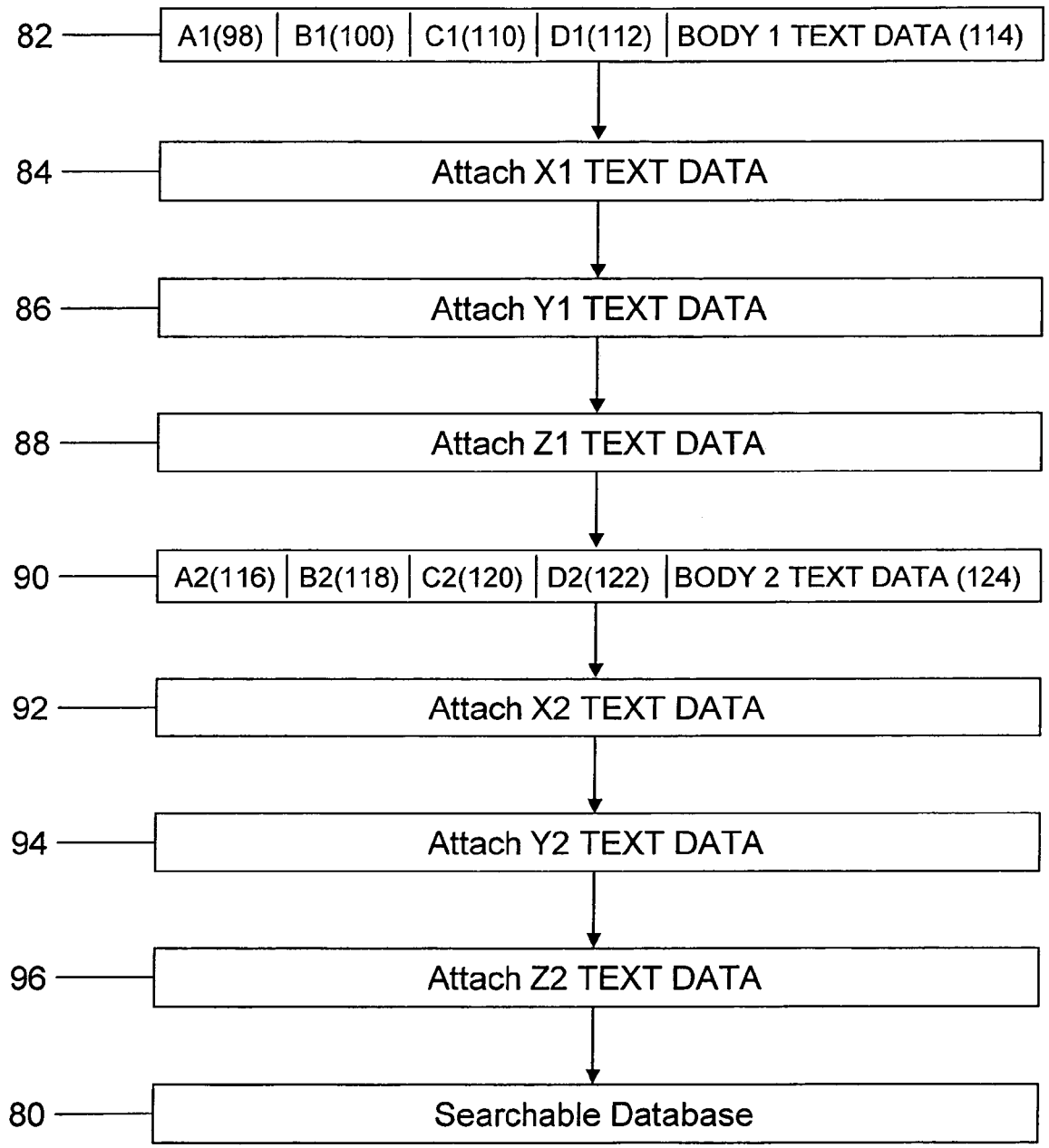
FIG. 3 is an exemplary embodiment of a searchable database in accordance with the present invention.

Referring to FIG. 3, an exemplary embodiment of a searchable database in accordance with the present invention is shown generally at 80. Upon operation of the program described in FIG. 1, the information contained in the electronic files of FIG. 2 will typically be organized as indicated in database 80.

Database 80 is a single file containing at least eight records 82, 84, 86, 88, 90, 92, 92, 94 and 96. Each record is created to contain the imported data from a specific document processed in accordance with the invention, and is organized into one or more fields of data.

For instance, the first record 82 is created to receive the data contained in e-mail 22. Record 82 includes at least five fields 98, 100, 110, 112 and 114. Database fields 98, 100, 110 and 112 include the text metadata from the FROM field 28 (i.e., A1), the TO field 30 (i.e., B1), the SUBJECT field 32 (i.e., C1) and the DATE field 34 (i.e., D1) of email 22 respectively. Additionally, field 114 contains the "Body 1 Text Data" imported from the BODY field 26 of email 22.

Records 84, 86 and 88 are arranged within database 80 in logical sequential order proceeding record 82, and are dedicated to the attachments associated with email 22. That is record 84 consists of at least one field containing the X1 Text Data, which was parsed out and imported in from attachment file 42 during processing in accordance with the exemplary program of FIG. 1. Additionally, records 86 and 88 contain the Y1 Text Data and Z1 Text Data imported from attachment files 44 and 46.

Once the email 22 and its associated attachments 42, 44 and 46 have been processed in accordance with the invention into database 80, the next sequentially logical email 48 and its attachments 68, 70 and 72 are processed to further build database 80. Accordingly, record 90 is created to receive metadata imported from email 48 and stored in fields 116, 118, 120 and 122. Additionally, the Body 2 Text Data parsed out of email 48 is stored in field 124 of record 90.

In similar fashion to records 84, 86 and 88, the records 92, 94 and 96 are arranged in logical sequential order proceeding record 90, and are dedicated to the attachments associated with email 48. That is the X2 Text Data of attachment 68, the Y2 Text Data of attachment 70 and the Z2 Text Data of attachment 72 are stored in records 92, 94 and 96 respectively.

The above program of FIG. 1 is a generalized exemplary program in accordance with the present invention. The resulting database structure shown in FIG. 3 allows a typical litigation support software program to perform key word searches and other search functions on all emails and associated attachments in a single search operation, rather than searching emails and attachments separately.

Litigation support software programs cannot normally build the above data structure into a database. In order to enable a litigation support program to build the database structure exemplified in FIG. 3, the imported data from emails and associated attachments must be processed properly and in the correct order, the processing program must be checked thoroughly during operation, and the documents must be properly tracked and labeled as they populate the database. This processing, checking, tracking and labeling can be difficult and complex. Additionally, as will be discussed in more detail herein, it is difficult to design a computer program which efficiently enables the importation of large bodies of text (such as the text contained in the body of an e-mail or an attachment) into a single field of a database without incurring software errors that inadvertently break up the text into several fields. The following FIGS. 4-9 exemplify a more detailed program in accordance with the present invention, which, when interfaced with a typical litigation support program, will efficiently build a database containing both email data and associated attachment data that can be searched in a single operation.

Figure 4:
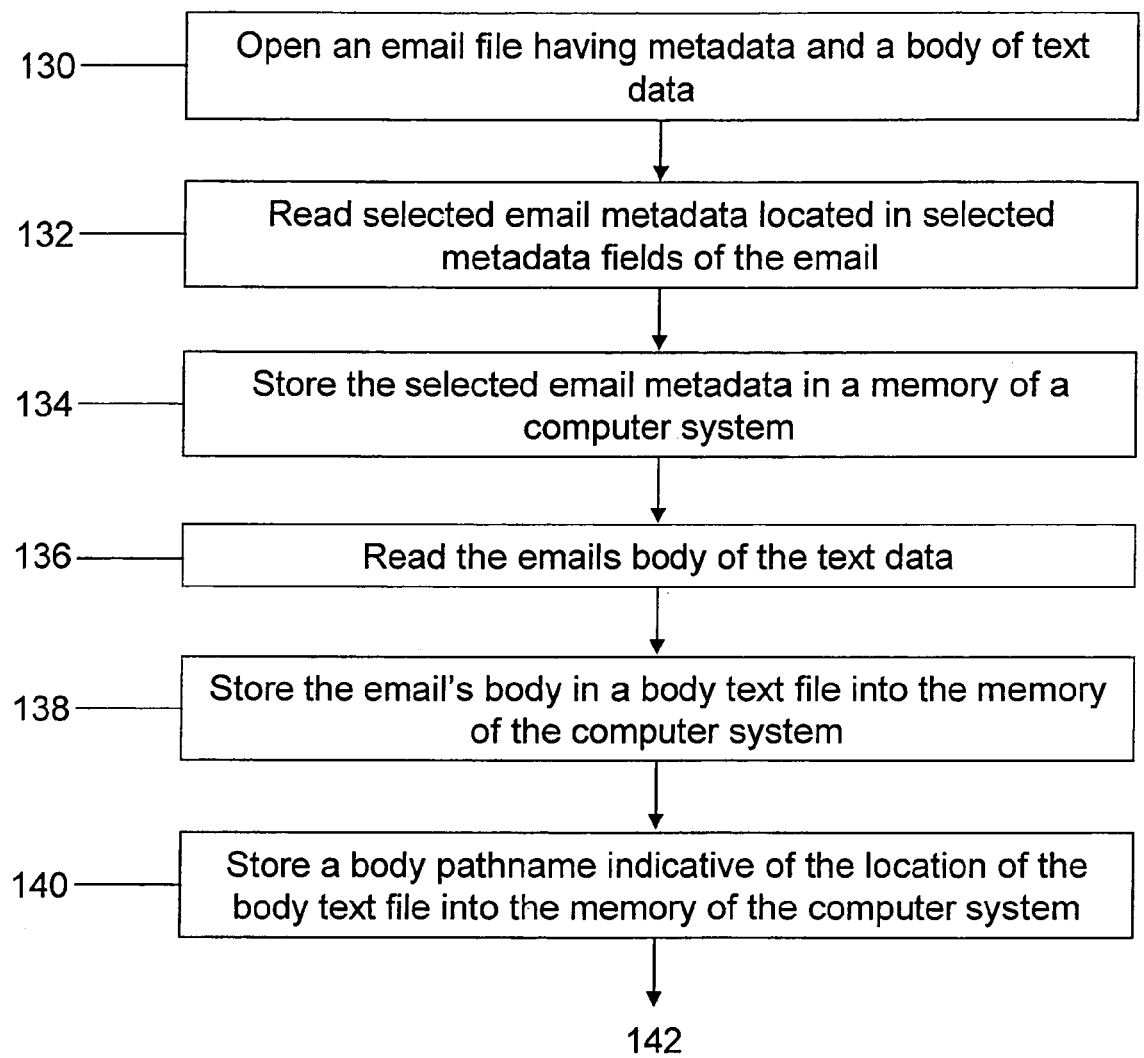
FIG. 4 is an exemplary embodiment of a detailed flow diagram of a computer program for storing e-mails and associated attachments in accordance with the present invention.
Figure 4A:
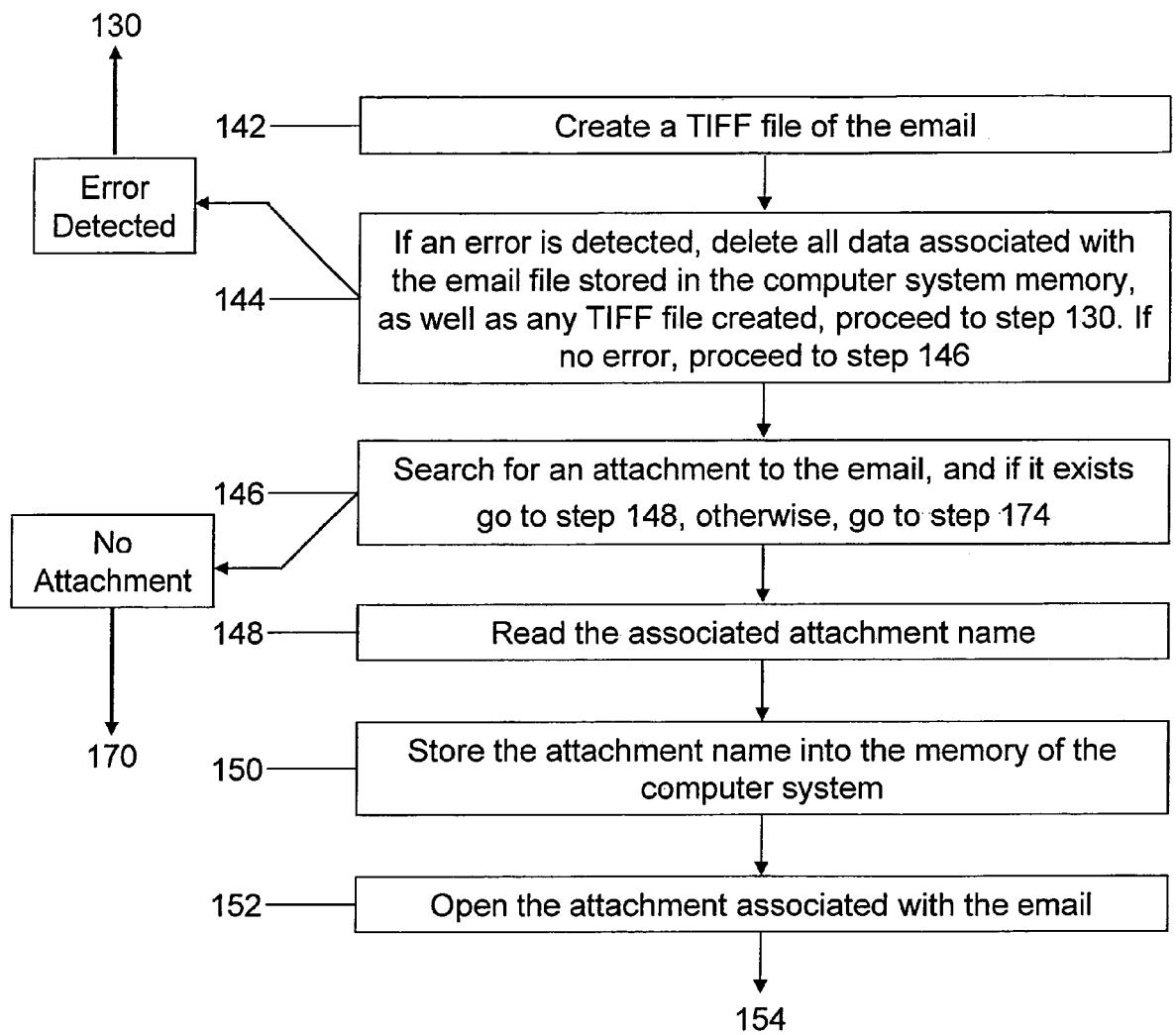
Figure 4B:
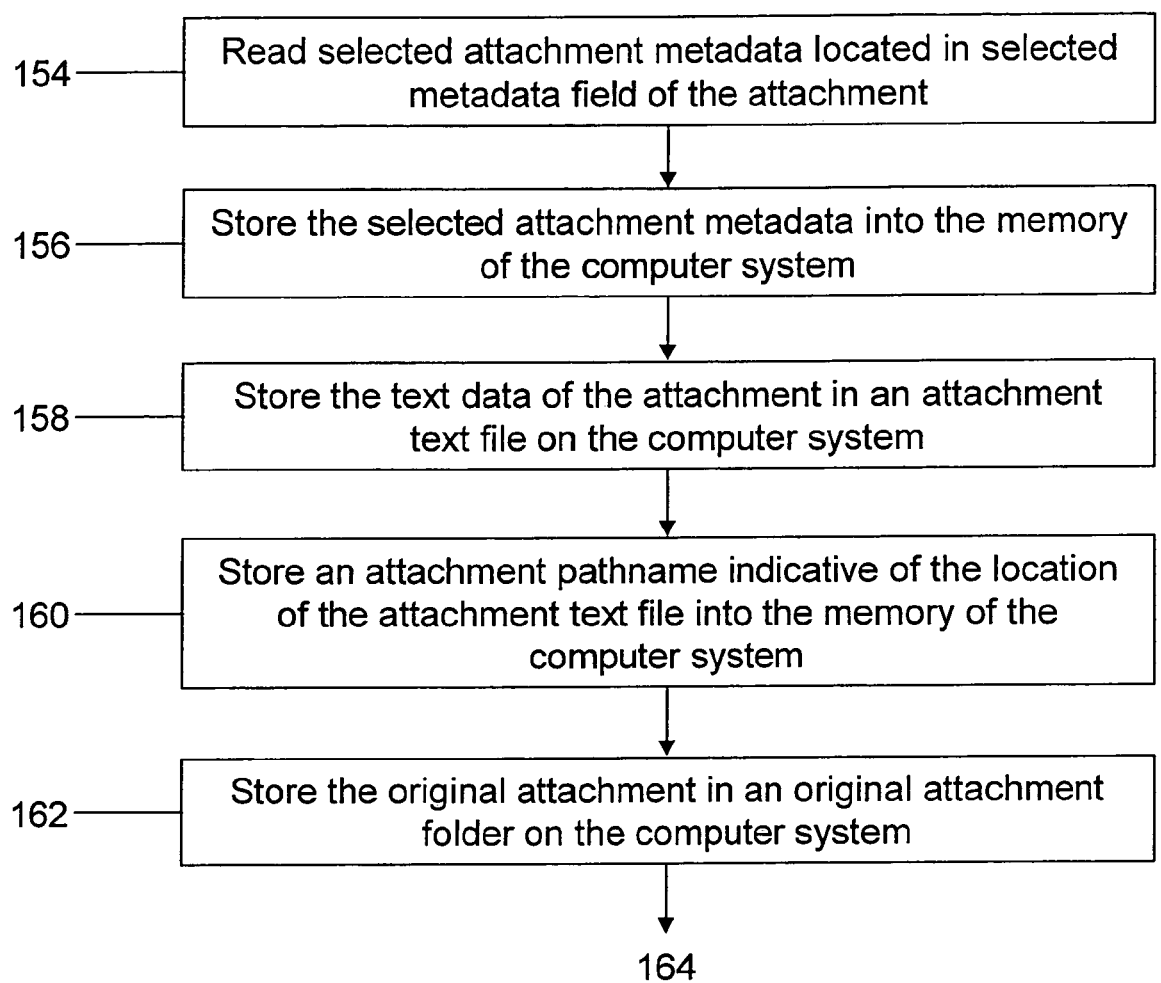
Figure 4C:
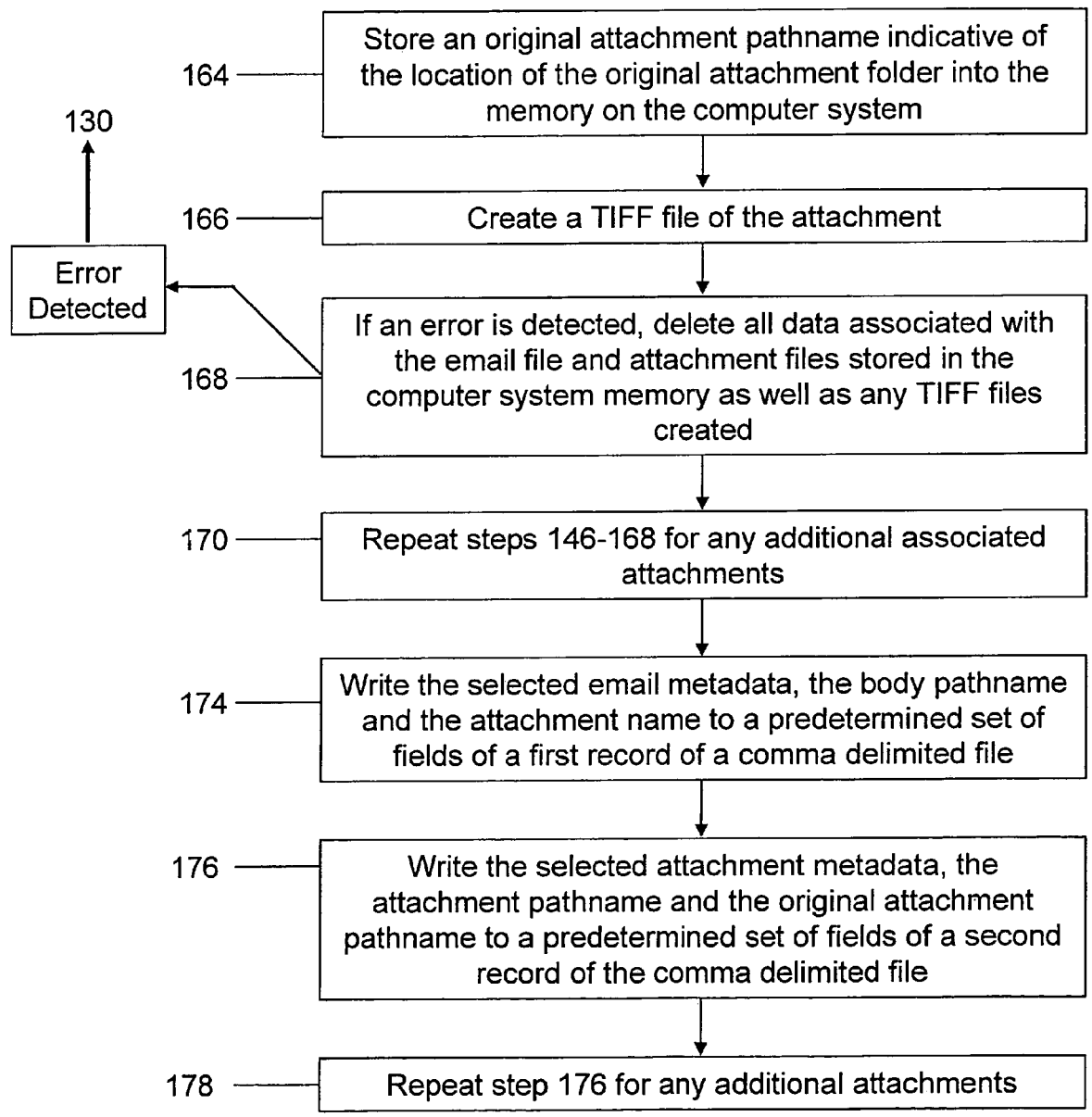

Referring to FIG. 4, an exemplary embodiment of a detailed flow diagram of a computer program for storing e-mails and associated attachments in accordance with the present invention is shown generally at 128. At step 130 (in similar fashion to step 10 of FIG. 1) an e-mail file having metadata and a body of text data is opened by the computer system. Selected e-mail metadata located in the header section of the e-mail is then read by the computer system at step 132. Moving to step 134, the selected e-mail metadata is then stored in the memory of the computer system. Next at step 136, the e-mail's body of text data is read by the program. At step 138 (in similar fashion to step 12 of FIG. 1) the body of text data is stored in a body text file in the memory of the computer system.

Proceeding to step 140, a body path name indicative of the location of the body text file is also stored in the memory of the computer system. A path name (or path) may be a sequence of symbols and names that identify and locate a file. One of the simplest types of path name is just the file name. Typically, if you specify a file name as the path name, the operating system looks for that file in the current working directory. However, if the file resides in a different directory, one must tell the operating system how to find that directory. This is usually done by specifying a path (path name) that the operating system must follow. Generally, the path name starts from the working or route directory. Each operating system has its own rules for specifying various paths. For example, in a DOS system the route directory is named back slash (/), and each sub directory is separated by an additional back slash.

Though a body path name has been used in this exemplary flow chart to indicate the memory location of the body text file in the memory of the computer, one skilled in the art will recognize that other types of software pointers may also be used to indicate memory location. For example, the pointer may simply be a special type of variable that holds the memory address of the body text file. Alternatively, the pointer may be a hyperlink created to link to the file in the memory location.

Advancing to Step 142, a TIFF file of the e-mail is created. TIFF files are created for every electronic file and its associated attachments processed by the invention in order to develop an image of each file that is difficult to tamper with.

The term TIFF is an acronym for "Tagged Image File Format", and is one of the most widely supported file formats for storing bit-mapped images on computer systems. TIFF graphics can be any resolution, and they can be black and white, grey scaled, or color. Files in TIFF format often end with a dot TIFF extension.

However, though a TIFF file is created in this exemplary flow chart, one skilled in the art will recognize that other popular formats for bit-mapped images also may be used. For example, BMP represents the standard bit-mapped graphics format used in the windows environment. PCX is also a graphics file format for graphics programs which generally run on personal computers and is supported by many optical scanners fax programs and desk top publishing systems.

Moving to Step 144, once a TIFF file of the e-mail has been created, an error check is initiated on the body text file associated with the e-mail. If an error is detected, all data associated with the e-mail file stored in the computer system memory as well as any TIFF files created are deleted. The computer then circulates back to Step 130 where it will open the next sequential e-mail to be processed. If, however, no error is detected, the computer proceeds on to Step 146.

At 146, the computer then searches for any attachments associated with the e-mail just processed. If no attachments exist, the computer will skip to Step 174 of this flow chart which will be discussed later. If an attachment or attachments do exist, the computer then steps to 148 where it reads the associated attachment name, and stores the attachment name into the memory of the computer system at 150.

In analogous fashion to Step 14 of FIG. 1, the operating system of the computer opens the attachment at Step 152. Once opened, the computer moves to Step 154 where it reads selected attachment metadata located in selected metadata fields of the attachment. At Step 156, the attachment metadata is also stored in the memory of the computer system.

Like Step 16 of FIG. 1, the computer advances to Step 158 where it stores the text data of the attachment in an attachment text file on the computer system. Additionally, at Step 160, an attachment path name which points to the memory location in the computer system of the attachment text file is also stored in the memory of the computer.

In Step 162, the attachment in its original format is stored in an original attachment folder on the computer system. At step 164, once the original attachment folder has been created, an original attachment pathname, indicative of the location of that original attachment folder is also stored in the memory of the computer. As will be discussed in greater detail herein, the original attachment pathname can be imported into a searchable database such as the one illustrated in FIG. 3, and utilized to create a hyperlink back to the original attachment. In this way, a user working in the searchable database can click on the hyperlink to view the attachment in its original format.

Advancing to Step 166, a TIFF file of the attachment is created. As explained previously with respect to the associated e-mail file, the purpose of creating the TIFF file of the attachment is to produce a bit-mapped image of the attachment which is difficult to manipulate.

Stepping to 168, once a TIFF file of the attachment has been created, an error check is then executed on the stored text data of the attachment located in the attachment text file. If an error is detected, all data associated with the attachment files as well as with the associated e-mail files, and any TIFF files created, will be deleted. Again, the program will cycle back to Step 130 to begin processing the next electronic file. As illustrated in Step 170, if no error is detected, the computer program will repeat Steps 146 through 168 to process, in like fashion, any additional attachment associated with the e-mail.

Moving to Step 174, once the e-mail and its associated attachments have been processed, the program will then write the selected e-mail metadata, the body path name and the attachment name to a predetermined set of fields of a first record of a comma-delimited file. In Step 176, the selected attachment metadata, the attachment path name and the original attachment path name are written to a predetermined set of fields of a second record of the comma-delimited file. Additionally, this process is repeated for any additional attachments at step 178.

A comma-delimited file has a data format in which each piece of data is separated by a comma. This is a popular format for transferring data from one application to another, because most data base systems are able to import and export comma-delimited data. In the instant case, the program is building the comma-delimited file to provide a mechanism to transfer e-mail and attachment data in the proper order to a litigation support software program such as Concordance or CaseMap. Once the comma-delimited file is completed, the litigation support software program will then be executed to import the data and build a database in accordance with the present invention. That is, the resultant database will enable all e-mails and associated attachments to be searched in a single search operation.

There is an important reason why the body path name (step 174), the attachment path name (step 176) and the original attachment path name (step 176) are stored in the fields of the comma-delimited file, rather than the associated text from the files they are pointing to. That is, text files, e.g., the body text file, attachment text file, the original attachment folder, can contain multiple commas in the text of those files. Problematically, the comma-delimited file will interpret every comma as an end of field indicator, and store the text between each comma in an undeterminable number of separate fields. To solve this problem, the path names only are stored in a single field each in the comma-delimited file. Once this is done, the pathnames can be imported into a searchable database, and act as pointers to import the associated text files in a secondary operation.

Figure 5:
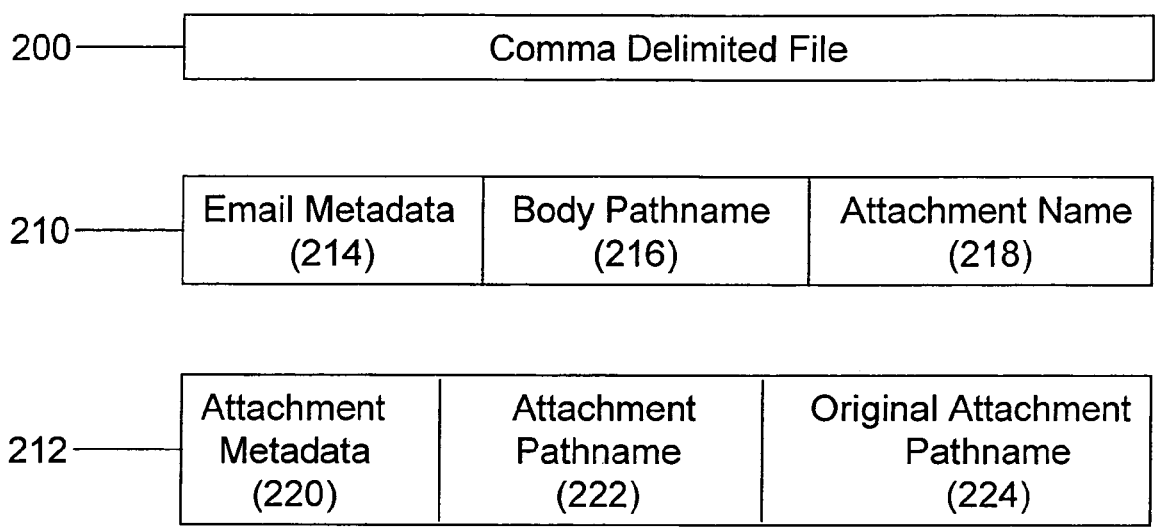
FIG. 5 is an exemplary embodiment of a comma delimited file processed in accordance with the present invention.

Referring to FIG. 5, an exemplary block diagram of the comma-delimited file created by the program of FIG. 4 is shown generally at 200. For an e-mail with at least one associated attachment, the comma-delimited file 200 will contain at least a first record 210 and a second record 212. The first 210 receives the data from the e-mail and the second record 212 receives data from the associated attachment. The data in the first record 210 is organized into at least three fields, 214, 216 and 218, each field of which will be separated by a comma (not shown). Field 214 is utilized to receive the parsed out metadata from the e-mail. Field 216 receives the body path name which indicates the location of the body text file. Field 218 receives the attachment name which is associated with the first attachment.

One can easily recognize that e-mail metadata may consist of many different individual sets of data from many different fields, e.g., data indicating from where a message was sent, who the message was sent to, and the date the message was sent. Accordingly, one will also recognize that field 214 may consist of many different metadata fields.

Record 212 proceeds record 210 in logical sequential order. Record 212 includes at least three comma-delimited fields, 220, 222 and 224 for receiving attachment metadata, the attachment path name and the original attachment path name respectively. Again, like the e-mail metadata field 214, attachment metadata field 220 may include many comma-delimited fields.

Figure 6:
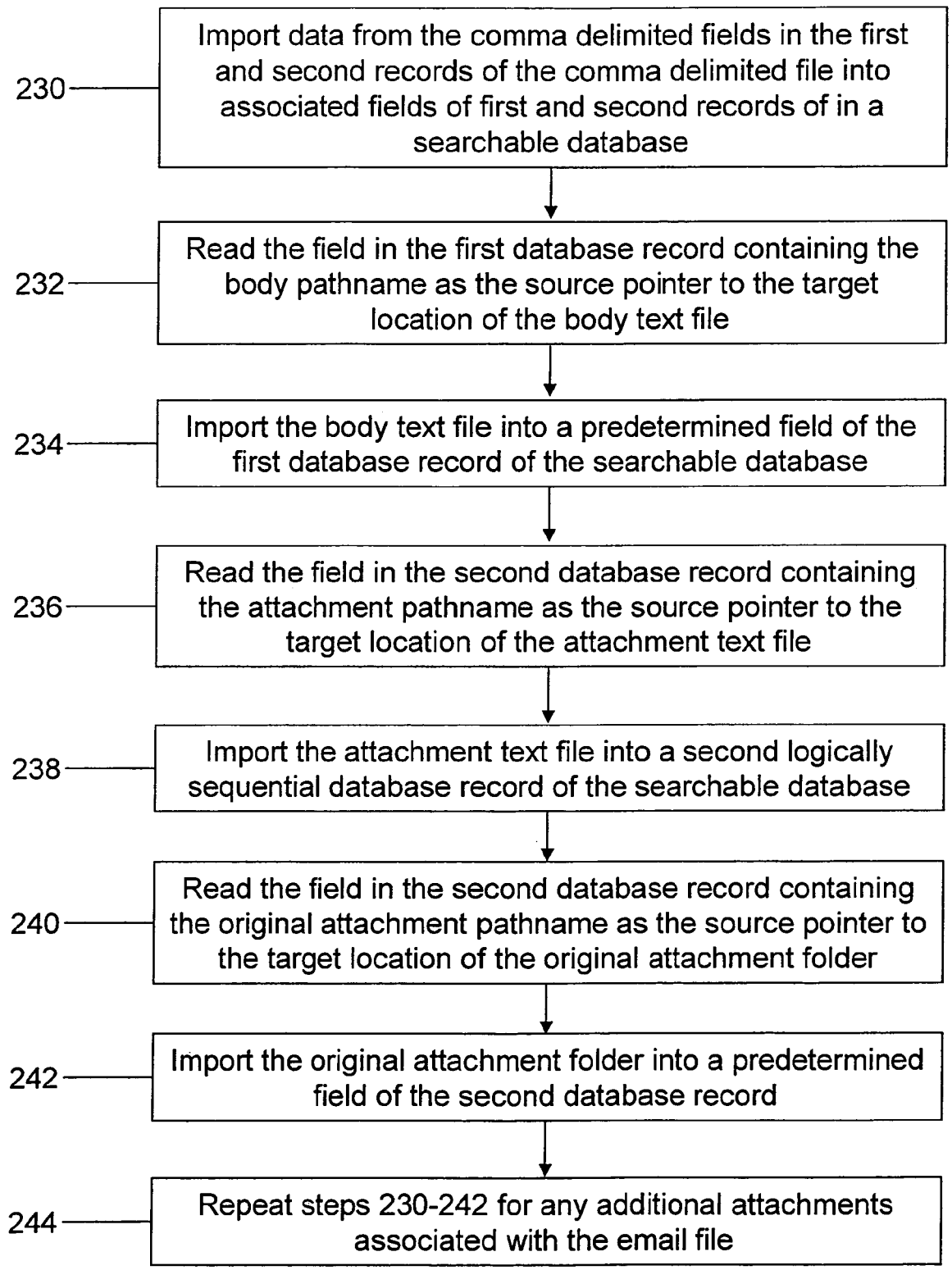
FIG. 6 is an exemplary embodiment of a flow diagram for importing the data from the comma delimited file of FIG. 5 into a searchable database in accordance with the present invention.
Figure 7:
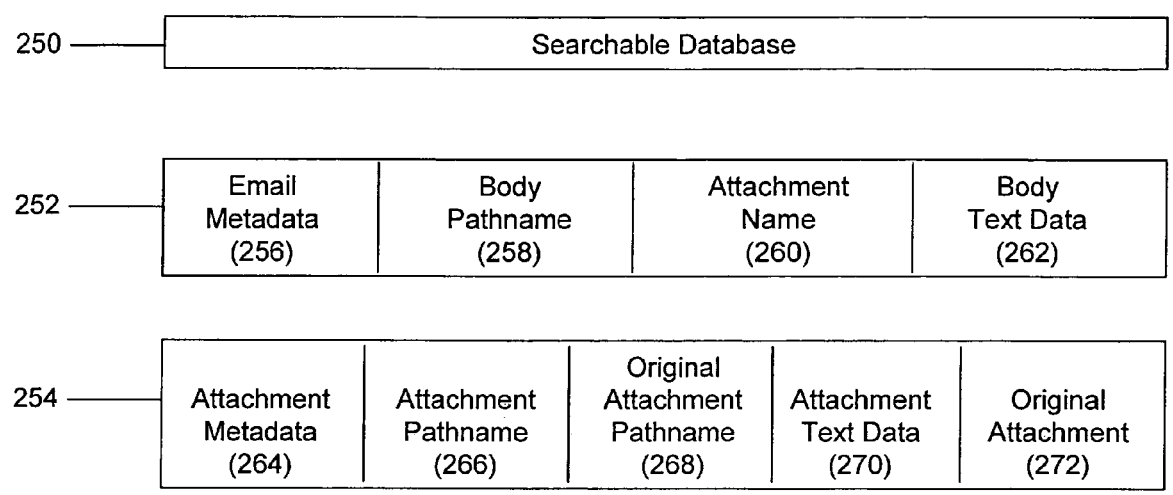
FIG. 7 is an exemplary embodiment of a searchable database constructed in accordance with the present invention, wherein the database is populated with the data from the comma delimited file of FIG. 5 in accordance with the flow diagram of FIG. 6.

Referring to FIGS. 5, 6 and 7, at Step 230 of flow diagram 228 (FIG. 6), the data from the comma-delimited fields in the first and second records of the comma-delimited file 200 (FIG. 5) is imported into associated fields of the searchable database 250 (FIG. 7). That is, the e-mail metadata in field 214, the body path name in field 216, and the attachment name in field 218 of FIG. 5 are imported respectively into fields 256, 258, and 260 of record 252 as shown in FIG. 7. Additionally, the attachment metadata in field 220, the attachment path name in field 222 and the original attachment field name in field 224 of FIG. 5 are also respectively imported into fields 264, 266 and 268 of record 254 as indicated in FIG. 7.

Advancing to Step 232 (FIG. 6), the field 258 (FIG. 7) in the first database record 252 (FIG. 7) containing the body path name is read as the source pointer to target the location of the body text file stored in the memory of the computer system. That is the body path name data which is now stored in field 258 of record 252 of the database 250 (FIG. 7) is used by the litigation support program to determine the memory location of the body text file which contains the body text data of the e-mail being processed.

Proceeding to Step 234 (FIG. 6), in analogous fashion with Step 18 of FIG. 1, the body text file stored in the computer system is imported into the first database record 252 (FIG. 7) of the searchable database 250 and stored in field 262. Proceeding to Step 236 (FIG. 6), the field 266 in a second database record 254 of searchable database 250 which contains the attachment path name is read as the source pointer to the target location of the attachment text file. Once the attachment text file memory location is determined by the litigation support software, the program steps to 238 (FIG. 6) where the attachment text file is imported into the second logically sequential database record 254 of the searchable database 250 and stored in field 270 (FIG. 7).

Stepping to 240 (FIG. 6), field 268 in the second database record 254 containing the original attachment path name is read as the source pointer to the target location of the original attachment folder. Accordingly, at Step 242 (FIG. 6), the original attachment folder data can now be imported into a predetermined field 272 (FIG. 7) of the second database record 254. In like fashion, as illustrated at Step 244 of FIG. 6, steps 230 through 242 are repeated for any additional attachments associated with the e-mail file being processed in order to fully construct the searchable database 250 (FIG. 7).

Figure 8:
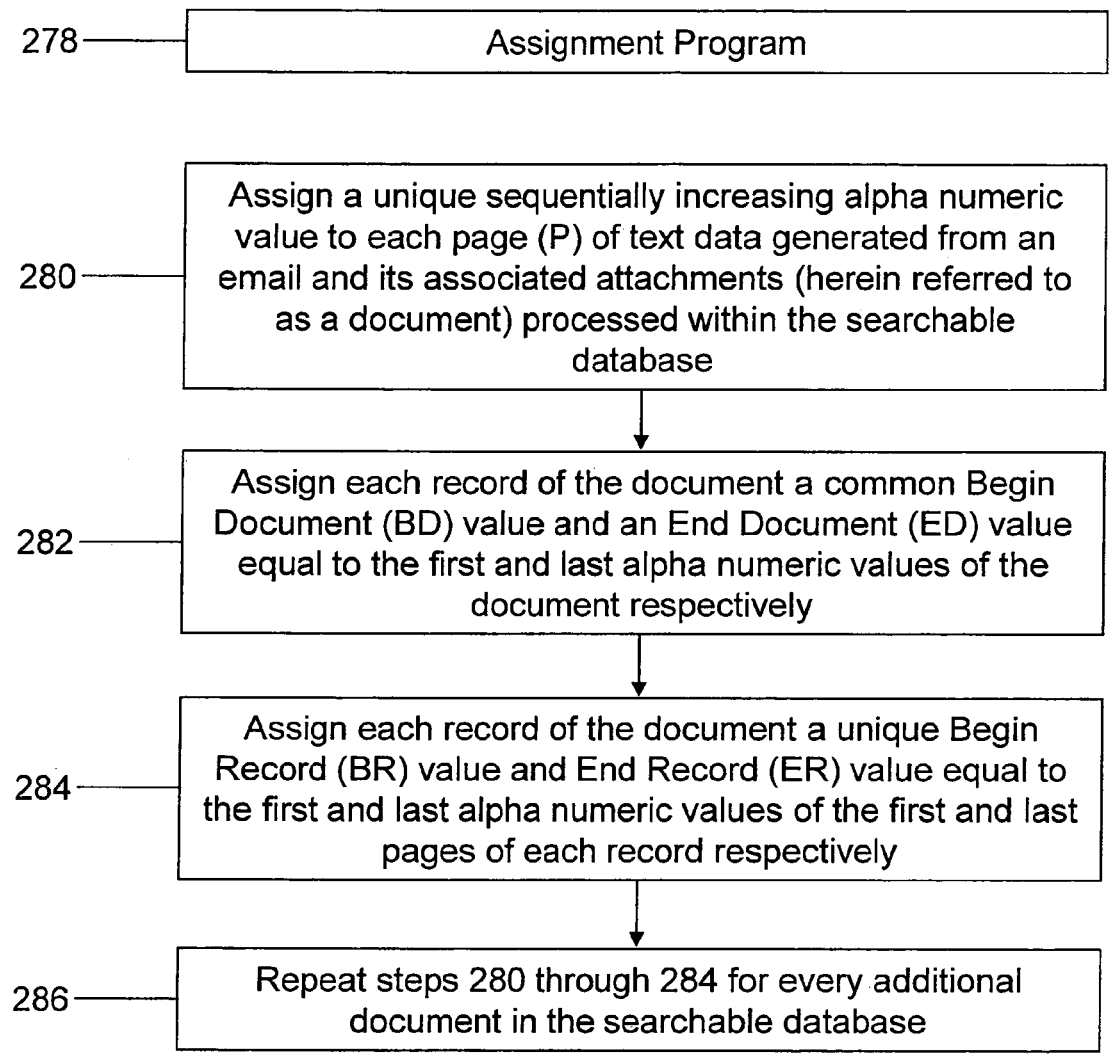
FIG. 8 is an exemplary embodiment of a program of numbering pages of a database in accordance with the present invention.

Referring to FIGS. 8 and 9, it can be seen that database 250 may end up being many thousands of pages long having many e-mails with multiple associated attachments. Therefore, it is important, if not necessary, for the pages to be numbered or labeled in such a way that one can easily determine which pages are associated with which e-mails or attachments, and which attachments are associated with which e-mails. FIG. 8 is a flow chart 278 illustrating one such exemplary program of numbering the pages, and FIG. 9 exemplifies a portion of database 250 after it has been numbered in accordance with the program of FIG. 8.

In Step 280 a unique sequentially increasing alpha numeric value is assigned to each page (P) of text data generated from an e-mail and its associated attachments processed within the searchable database 250. For purposes herein, the email and its associated attachments will be referred to as a single document or document file. Though FIG. 9 only illustrates a single document file 288, it is understood that database 250 may have any number of document files, each document file having a single e-mail, and a set of zero or more attachments associated with the e-mail.

Document file 288 of database 250 has a single e-mail 252 and three attachments, 254, 306 and 308 associated with the e-mail. The e-mail 252 includes a single page 290. Attachment 254 has three pages, 292, 294 and 296 respectively. Attachment 306 includes two pages, 298 and 300 and finally attachment 308 includes two pages, 302 and 304 respectively.

In accordance with Step 280, the pages of document file 288 are numbered P1 through P8 wherein each consecutive page increases with a sequential value of one. One can see that any type of numbering or alpha-numeric numbering system can be used to indicate the pages of the document file 288, so long as the pages are number in a sequential order. For example, the pages may increase by a twos instead of ones, or the pages may be numbered in an increasing alphabetical sequence such as A, B, C, etc.

Proceeding to Step 282, each record 252, 254, 306 and 308 of the document file 288 is assigned a common begin document (BD) value, and an end document (ED) value, equal to the first and last alpha-numeric values assigned to the pages of the document file 288 respectively. In this case, the BD value will be equal to 1, i.e., the value of the first page of the document file, and the ED value will be equal to 8, i.e., the value of the last page of the document file. Accordingly, each of the records 252, 254, 306 and 308 in addition to having consecutively numbered pages in ever increasing order, will also be assigned the common BD number 1 and the common ED number 8.

Proceeding to Step 284, each record of document file 288 is assigned a unique begin record (BR) value and end record (ER) value which is equal to the first and last alpha-numeric values of the first and last pages of that record respectively. In the instant case, the first record 252 is the e-mail record and includes only page 1. Therefore, its BR and ER values are both set to 1.

The second record 254 is an attachment record. Because the first and last pages of that record are labeled 2 and 4, the BR and ER values are also equal to 2 and 4 respectively. The next record 306 is also an attachment with two pages labeled P5 and P6. Accordingly, the BR value is labeled 5 and the ER value is labeled 6. Finally, in like fashion, record 308 is an attachment of two pages, P7 and P8 respectively. Therefore, the BR value is 7 and the ER value is 8.

Proceeding to step 286, the program cycles back through steps 280 through 284 for the next document file in the searchable database 250. The program will continue cycling back until every document file in the database 250 is numbered accordingly.

By assigning the alpha-numeric values per program 278, each page of an e-mail and its associated attachments within a document file will have three unique sets of values. The values will enable the user to easily identify the total number of pages in a document file, whether the page is a part of an e-mail or part of an associated attachment, and the total number of pages of that e-mail or attachment. For example, in performing a key word search through the database 250, the second page 294 of record 254 may be pulled up. The user can see that the values assigned to it will be P-3, BD-1, ED-8, BR-2 and ER-4. Since the begin database BD and begin record BR values are not equal this must be page 3 of an attachment rather than page 3 of the associated e-mail. It can be seen that the total number of pages associated with the e-mail and its attachments, i.e., document file 288, is 8 because of the BD and ED values differ by 8. It can also be seen that the particular attachment 254 associated with this page 294 is three pages long because the BR and ER values differ by 4.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A computer program for storing e-mail files and associated attachments in a searchable database stored on a computer readable medium of a computer system having a memory for executing the program, the program comprising:

opening an e-mail file having metadata and a body of text data;

storing selected e-mail metadata in a memory of a computer system;

storing the e-mail's body in a body text file in the memory of the computer system;

storing a body pathname indicative of the location of the body text file in the memory of the computer system;

opening at least one attachment associated with the e-mail;

storing the at least one attachment metadata in the memory of the computer system;

storing text data of the at least one attachment in an attachment text file in the memory of the computer system;

storing a pathname of the at least one attachment, said pathname being indicative of the location of the attachment text file in the memory of the computer system;

writing the selected e-mail metadata, and the body pathname to a predetermined set of fields of a first record of comma delimited file;

writing the at least one attachment metadata and the at least one attachment pathname to a predetermined set of fields of a second logically sequential record of the comma delimited file;

importing the e-mail metadata and body pathname from the comma delimited fields stored in the first record of the comma delimited file into a first record of a searchable database;

importing the at least one attachment metadata and attachment pathname from the comma delimited fields stored in the second record of the comma delimited file into a second logically sequential record of a searchable database;

reading the field in the first database record containing the body pathname as a source pointer to the location of the body text file in the memory of the computer system;

importing the body text file from the memory of the computer system into the first database record of the searchable database;

reading the field in the second database record containing the attachment pathname as a source pointer to the location of the attachment text file in the memory of the computer system;

importing the attachment text file from the memory of the computer system into the second database record of the searchable database;

storing in the searchable database a plurality of attachment text files representing a plurality of attachments associated with the e-mail, the attachment text files being stored in successive records which are in logical sequential order relative to the first record containing the body text file of the e-mail, the first record and the successive records comprising a document file with a plurality of pages of text data;

assigning a unique sequentially increasing alpha numeric value to each page of text data of the document file;

assigning each record of the document file a common BD value and ED value equal to the first and last alpha numeric values of the document file respectively; and assigning each record of the document file a unique BR value and ER value equal to the first and last alpha numeric values of the first and last pages of each record respectively.

2. The program of claim 1 comprising:

creating a bit mapped image of the e-mail after the e-mail's body has been stored in the body text file;

checking the body text file for errors after the creation of the bit mapped image of the e-mail;

deleting all data stored in the computer system associated with the e-mail, including the body text file and bit mapped image of the e-mail, if an error is detected.

3. The program of claim 2 comprising:

creating a bit mapped image of the at least one attachment after the attachment text data has been stored in the attachment text file checking the attachment text file for errors after creation of the bit mapped image of the at least one attachment;

deleting all data stored in the computer system associated with the at least one attachment and the e-mail, including the attachment text file, the body text file and the bit mapped images of the at least one attachment and e-mail, if an error is detected.

4. The program of claim 3 wherein the bit mapped images of the at least one attachment and e-mail are TIFF files.

5. The program of claim 1 comprising:

storing the at least one attachment in its original format in an original attachment folder in the memory of the computer system;

storing an original attachment pathname indicative of the location of the original attachment folder in the memory of the computer system;

writing the original attachment pathname to a field of the second logically sequential record of the comma delimited file;

importing the original attachment pathname from the comma delimited field stored in the second record of the comma delimited file into a field of the second logically sequential record of the searchable database; and constructing a hyperlink from the database to the original attachment folder from the original attachment pathname stored in the database.

6. The program of claim 1 wherein the program includes a first program and a second program interfaced to enable the storage of the e-mail and associated attachments in the database.

7. A computer system comprising:
an executable memory; and
a computer program stored in the executable memory, the computer program for storing e-mail files and associated attachments in a searchable database, the program including:
opening an e-mail file having metadata and a body of text data;
storing selected e-mail metadata in a memory of a computer system;
storing the e-mail's body in a body text file in the memory of the computer system;
storing a body pathname indicative of the location of the body text file in the memory of the computer system;
opening at least one attachment associated with the e-mail;
storing the at least one attachment metadata in the memory of the computer system;
storing text data of the at least one attachment in an attachment text file in the memory of the computer system;
storing a pathname of the at least one attachment, said pathname being indicative of the location of the attachment text file in the memory of the computer system;
writing the selected e-mail metadata, and the body pathname to a predetermined set of fields of a first record of a comma delimited file;
writing the at least one attachment metadata and the at least one attachment pathname to a predetermined set of fields of a second logically sequential record of the comma delimited file;
importing the e-mail metadata and body pathname from the comma delimited fields stored in the first record of the comma delimited file into a first record of a searchable database;
importing the at least one attachment metadata and attachment pathname from the comma delimited fields stored in the second record of the comma delimited file into a second logically sequential record of a searchable database;
reading the field in the first database record containing the body pathname as a source pointer to the location of the body text file in the memory of the computer system;
importing the body text file from the memory of the computer system into the first database record of the searchable database;
reading the field in the second database record containing the attachment pathname as a source pointer to the location of the attachment text file in the memory of the computer system;
importing the attachment text file from the memory of the computer system into the second database record of the searchable database;
storing in the searchable database a plurality of attachment text files representing a plurality of attachments associated with the e-mail, the attachment text files being stored in successive records which are in logical sequential order relative to the first record containing the body text file of the e-mail, the first record and the successive records comprising a document file with a plurality of pages of text data;
assigning a unique sequentially increasing alpha numeric value to each page of text data of the document file;
assigning each record of the document file a common BD value and ED value equal to the first and last alpha numeric values of the document file respectively; and
assigning each record of the document file a unique BR value and ER value equal to the first and last alpha numeric values of the first and last pages of each record respectively.

8. The computer system of claim 7 wherein the program further comprises:
creating a bit mapped image of the e-mail after the e-mail's body has been stored in the body text file;
checking the body text file for errors after the creation of the bit mapped image of the e-mail;
deleting all data stored in the computer system associated with the e-mail, including the body text file and bit mapped image of the e-mail, if an error is detected.

9. The computer system of claim 8 wherein the program further comprises:
creating a bit mapped image of the at least one attachment after the attachment text data has been stored in the attachment text file
checking the attachment text file for errors after creation of the bit mapped image of the at least one attachment;
deleting all data stored in the computer system associated with the at least one attachment and the e-mail, including the attachment text file, the body text file and the bit mapped images of the at least one attachment and e-mail, if an error is detected.

10. The computer system of claim 9 wherein the bit mapped images of the at least one attachment and e-mail are TIFF files.

11. The computer system of claim 7 wherein the program includes a first program and a second program interfaced to enable the storage of the e-mail and associated attachments in the database.

* * * * *